United States Patent
Aatresh

[19]

[11] Patent Number: 6,067,301

[45] Date of Patent: May 23, 2000

[54] METHOD AND APPARATUS FOR FORWARDING PACKETS FROM A PLURALITY OF CONTENDING QUEUES TO AN OUTPUT

[75] Inventor: Deepak J. Aatresh, Sunnyvale, Calif.

[73] Assignee: Cabletron Systems, Inc., Rochester, N.H.

[21] Appl. No.: 09/087,064

[22] Filed: May 29, 1998

[51] Int. Cl.[7] .............................. H04L 12/28; H04L 12/56
[52] U.S. Cl. ......................................................... 370/418
[58] Field of Search ................................... 370/412, 413, 370/414–418, 468, 461

[56] References Cited

U.S. PATENT DOCUMENTS

| | | | |
|---|---|---|---|
| 5,231,633 | 7/1993 | Hluchyj et al. | 370/94.1 |
| 5,425,029 | 6/1995 | Hluchyj et al. | 370/94.1 |
| 5,426,635 | 6/1995 | Mitra et al. | 370/60 |
| 5,742,606 | 4/1998 | Iliadis et al. | 370/413 |
| 5,748,629 | 5/1998 | Caldara et al. | 370/389 |
| 5,870,629 | 2/1999 | Borden et al. | 395/864 |

Primary Examiner—Dang Ton
Assistant Examiner—David R Vincent
Attorney, Agent, or Firm—Law Offices of Mark A. Wilson; Mark A. Wilson

[57] ABSTRACT

A method and apparatus for forwarding packets from contending queues of a multiport switch to an output of a finite bandwidth involve first prioritizing the contending queues into different priorities that relate to priorities of the packets that are being forwarded in the network. Bandwidth of the output is then allocated among the prioritized contending queues and the bandwidth of the output is consumed by the queued packets according to the allocated proportions. Any unconsumed bandwidth is distributed to the queues on a priority basis such that the highest priority queue is offered the unconsumed bandwidth first and lower priority queues are offered the remaining unconsumed bandwidth in priority order. An advantage of the invention is that queues are not starved of bandwidth by higher priority queues and unconsumed bandwidth is not wasted when there are not enough packets to consume an allocated portion of the output bandwidth. The method is adjustable during normal network operations through a programming interface to provide a specified quality of service.

35 Claims, 8 Drawing Sheets

REGISTER VALUES

| 16,384 |
| 14,746 |
| 9,830 |
| 7,373 |
| 0 |

CORRESPONDING BANDWIDTH ALLOCATION

CTRL    10%
HI    30%
MED    15%
LO    45%

FIG. 9

METHOD AND APPARATUS FOR FORWARDING PACKETS FROM A PLURALITY OF CONTENDING QUEUES TO AN OUTPUT

TECHNICAL FIELD

The invention relates generally to a high bandwidth multiport switch, for instance as used in gigabit ethernet networks. More particularly, the invention relates to the buffering of packets within a switch and maintaining Quality of Service (QoS) through the switch.

BACKGROUND OF THE INVENTION

Networks are used to transfer voice, video, and data between various network devices. Network devices such as switches are located within networks to direct the transfer of network traffic between the various network devices. Network traffic is typically bursty in nature and in order to compensate for network traffic bursts, memory buffers have been incorporated into switch designs. Memory buffers allow a switch to temporarily store packets when an incoming data rate is higher than an outgoing data rate. When more than one buffer has packets that are contending for the same output, some packets are required to wait in the buffers and some mechanism is needed to determine how packet contention is resolved.

In order to resolve contention and provide a higher QoS to a network switch, two different buffer management schemes, priority queuing and weighted fair queuing, are known. In the priority queuing scheme, contending queues are assigned different priorities and packets are forwarded from the queues in strict priority order. For example, referring to FIG. 1, four queues A, B, C, and D buffer packets that are contending for the same output 20 that has a finite bandwidth. To resolve the contention, the queues are assigned different priorities such as first, second, third, and fourth priority. Packets are similarly prioritized and queued according to their priority. The queued packets are forwarded to the output in priority order such that all packets from higher priority queues are forwarded before any packets from lower priority queues. While priority queuing works well when there is contention between queues, the higher priority packets are forwarded at the expense of lower priority packets. When higher priority packets consume the majority of the finite output bandwidth, the lower priority packets are starved of bandwidth and can back up through the switch architecture, potentially increasing latency to the point where packets are dropped. Dropping a few packets from a transfer may require an entire stream of packets to be retransmitted, practically defeating the benefits gained from prioritizing the contending queues in the first place.

In the weighted fair queuing scheme, contending queues are assigned weights and packets are forwarded from the queues in proportion to the weights assigned to each queue. For example, referring to FIG. 2, four queues A, B, C, and D buffer packets that are contending for the same finite bandwidth output 30. To resolve contention, each queue is assigned a percentage, or weight, that represents the amount of bandwidth that is reserved for that queue. If the total available bandwidth of the output were 100 bytes per second, then with queue weights assigned as 20%, 25%, 15%, and 40%, queue A would forward 20 bytes per second to the output, queue B would forward 25 bytes per second to the output, queue C would forward 15 bytes per second to the output, and queue D would forward 40 bytes per second to the output, with each portion being forwarded every second.

While the weighted fair queuing scheme works well for preventing the problem of starvation that occurs in priority queuing and for establishing a maximum flow rate for each queue, output bandwidth is often wasted when one of the queues does not contain packets for forwarding to the output. Bandwidth is wasted because the percentage of the output bandwidth reserved for the particular queue is reserved whether or not there are packets waiting. If an attempt is made to distribute the excess bandwidth, under the weighted fair queuing scheme, there is no obvious way to distribute the excess bandwidth between the queues because the queues do not have any assigned priority relative to one another.

An additional disadvantage of weighted fair queuing is that the bandwidth limits are not flexible and therefore will not adjust to variations in traffic patterns. It is hard to predict where the stringent bandwidth limits should be set for optimum network performance, especially when traffic patterns are constantly changing. Further, setting bandwidth limits requires precise tuning by a network administrator.

In addition to the disadvantages of queue starvation and wasted bandwidth that result from the priority and weighted fair queuing schemes, prior art switches implement the priority and weighted fair queuing schemes utilizing general purpose central processing units (CPUs) in conjunction with application-specific software. Although software applications are generally easier to develop and more flexible to update than logic embedded into application-specific integrated circuits (ASICs), operations performed in software typically take more time and have greater overhead relative to logic that is embedded into ASICs. As bandwidth requirements for networks increase, the speed with which contending packets are released from buffers is of greater concern.

In view of the above-stated disadvantages of the prior art, what is needed is a way to avoid the starvation of prioritized queues while logically distributing unused bandwidth at speeds required by, for example, gigabit ethernet networks.

SUMMARY OF THE INVENTION

A method and apparatus for forwarding packets from contending queues to an output having a finite bandwidth involve prioritizing the contending queues, allocating shares of the output bandwidth to the prioritized queues, forwarding prioritized packets in accordance with the allocated proportions, and then distributing any unconsumed bandwidth to the prioritized queues on a priority basis. In a preferred embodiment, the unconsumed bandwidth is offered to the queues in priority order from the highest priority queue to the lowest priority queue. Further, in the preferred embodiment, the logic for performing queue management is embedded in an application specific integrated circuit.

The method and apparatus of the invention are preferably implemented in a high bandwidth multiport switch in which packets are buffered before being output from the switch. The architecture of the multiport switch includes data links which are connected to input/output controllers which are connected to a switch fabric. The data links provide the data paths between other devices in the network and the multiport switch. There may be multiple data links of varying types and capacities connected to the multiport switch. Preferably, the data links are twisted pair wires and optical fibers that carry variable-length packets at 10, 100, and 1,000 Mbps according to the ethernet protocol.

The input/output controllers are connected between the data links and the switch fabric to provide packet control between the data links and the switch fabric. Packet control functions include transmitting and receiving packets from and to the data links as well as buffering incoming and/or outgoing packets to accommodate fluctuations in network traffic rates. The input/output controllers also supply the switch fabric with packets for processing through the fabric.

The switch fabric provides the physical data paths to connect different data links of the switch. In addition, the switch fabric schedules packets for transmission through the fabric in a manner that maximizes the bandwidth of the switch fabric.

Because contention occurs when packets incoming on different data links desire to be output on the same data link, the input/output controller architecture includes input packet buffering and queue management functions that help to minimize packet losses. In addition, because the switch fabric may be capable of supplying packets to an output data link faster than the data link can receive the packets, the input/output controller architecture includes output packet buffering and queue management. The preferred embodiment of the invention is described with reference to output packet buffering and queue management, although the invention is equally applicable to input packet buffering and queue management.

In the preferred embodiment, the input/output controllers include output queue managers that utilize embedded logic to manage packet queues representative of packets of data that are stored in an output buffer. The buffer is an integrated circuit of dynamic random access memory (DRAM) and the queues in the output queue manager represent the packets that are stored in the buffer. The output buffers can be integrated into the I/O controllers or they can be external to the I/O controllers. In the preferred embodiment, the output buffers are located next to the I/O controllers and not integrated onto the same circuits as the I/O controllers. The output queue managers are integrated circuits that include application specific devices, such as counters and comparators, to create the logic that carries out queue management. The output queue managers are fully adjustable through a programming interface that can be controlled by, for example, a network administrator. The programming interface provides queue-specific adjustability that can be manipulated while the switch is in operation to provide a specified QoS.

In the preferred embodiment, variable-length packets are prioritized into four categories based on certain characteristics of the packets. The packet characteristics of interest to the prioritization may include the source and/or destination of the packet, the type of information carried in the packet, or the age of the packet. For example, a packet carrying video conferencing data may have a higher priority than a packet carrying e-mail, because the quality of the video conference is negatively affected when packets are delayed while an e-mail transfer is more tolerant of packet delays. Four queues that track the established packet priority categories are associated with each port of an input/output controller. The four queues track the four priority categories and both the packet and queue priorities are defined, for description purposes, as control (CTRL), high (HI), medium (MED), and low (LO), where control is the highest priority and low is the lowest priority. The queue scheme is not limited to four queues and can be scaled up or down.

The input/output controllers receive packets from the switch fabric, and if the packets are not immediately forwarded to a data link, the packets are buffered in memory and the appropriate queue within the queue manager is updated with information related to the buffered packet. When priority queuing is the only queue management scheme being utilized, all packets of a higher priority are forwarded from the prioritized queues before any packets of a lower priority. For example, any packets in the control queue will be forwarded to an associated data link before packets from the high, medium, or low queues. In the queue management scheme of the invention, weighted fair queuing is implemented in conjunction with priority queuing to better utilize the finite bandwidth of an output.

In operation, each one of the four priority queues is allocated a respective share of the total output data link bandwidth to be consumed over a designated period of time. During each designated time period, packets are released from the queues to the associated data link in priority order according to their allocated shares such that the allocated packets in the control queue are released before the allocated packets in the high queue and so on. The key to the queue management scheme of the invention is that when a queue does not consume its entire allocated bandwidth during a designated time interval, the excess bandwidth is allocated to the other queues on a priority basis. That is, excess bandwidth is first offered to the control queue, and if the control queue has enough waiting packets then the entire excess bandwidth is consumed by the control queue. On the other hand, if the control queue does not consume all of the excess bandwidth then the excess bandwidth is offered to the next lower priority queue and so on until all of the available output bandwidth is consumed or until no packets remain in the output buffer.

One of the main operating considerations of the weighted priority queuing scheme of the invention is the balancing between latency and error. The problem of balancing latency and error is aggravated by the fact that packet lengths can vary over a wide range. In the context of the invention, latency is the amount of time that expires between a first packet from a particular queue entering an associated output data link and the next packet from the same queue entering the same output data link after all of the other priority queues have been offered their allocated bandwidth. Error is a measure of how closely actual bandwidth consumption on a particular output data link compares to the established bandwidth allocation proportions for the data link. Error is caused because once a packet begins transmitting from a buffer onto a data link the packet continues being transmitted until the transmission is complete. When a packet takes more time to transmit than the queue-specific time interval that is allocated for the particular queue, the packet transmission continues and the error grows in proportion to the excess time consumed. When balancing latency and error, a relatively long bandwidth allocation cycle time will create high packet latency but a low error rate, and if latency is too high, queues may be practically starved between cycle times and packets may begin to be dropped. On the other hand, a relatively short bandwidth allocation cycle time will create low packet latency but a high error rate as more packets exceed the relatively short queue-specific time intervals that are allocated for packet transmission.

Advantages of the invention include that the queue management scheme avoids packets being unnecessarily dropped by allocating bandwidth to each queue and automatically adapts to changes in network traffic patterns by distributing unconsumed bandwidth in priority order. In addition, the queue management scheme is flexible because the pre-established bandwidth allocations are automatically adjusted when queues are allocated more bandwidth than needed. Further, because the logic for the weighted priority queuing scheme is embedded into application specific integrated circuits, the scheme can be easily adopted in a high bandwidth switch such a gigabit ethernet switch.

BRIEF DESCRIPTION OF THE DRAWINGS

FIG. 9 is a depiction of internal register values used for allocating bandwidth between four priority queues.

DETAILED DESCRIPTION

Figure 1:
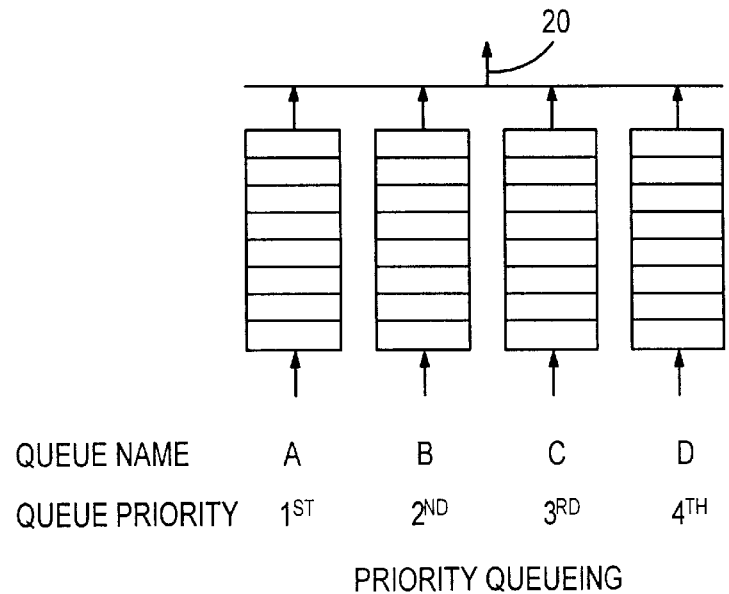
FIG. 1 is a depiction of a priority queuing scheme in accordance with the prior art.
Figure 2:
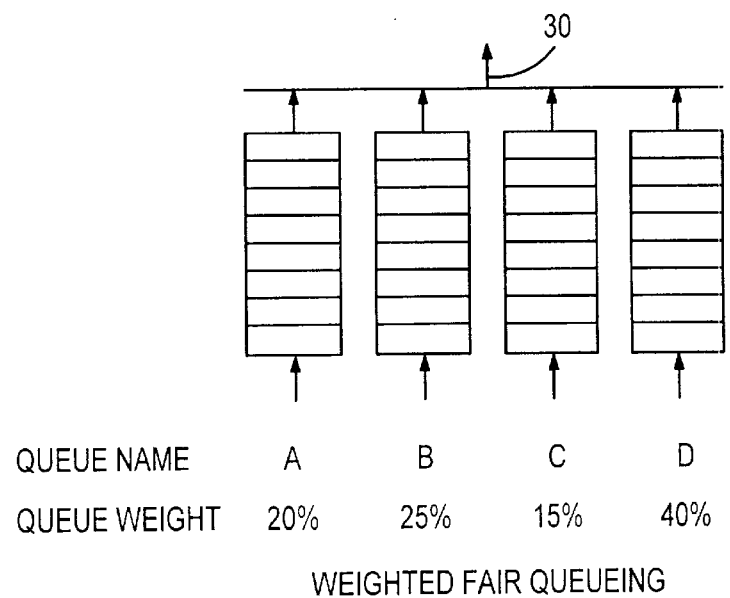
FIG. 2 is a depiction of a weighted fair queuing scheme in accordance with the prior art.
Figure 3:
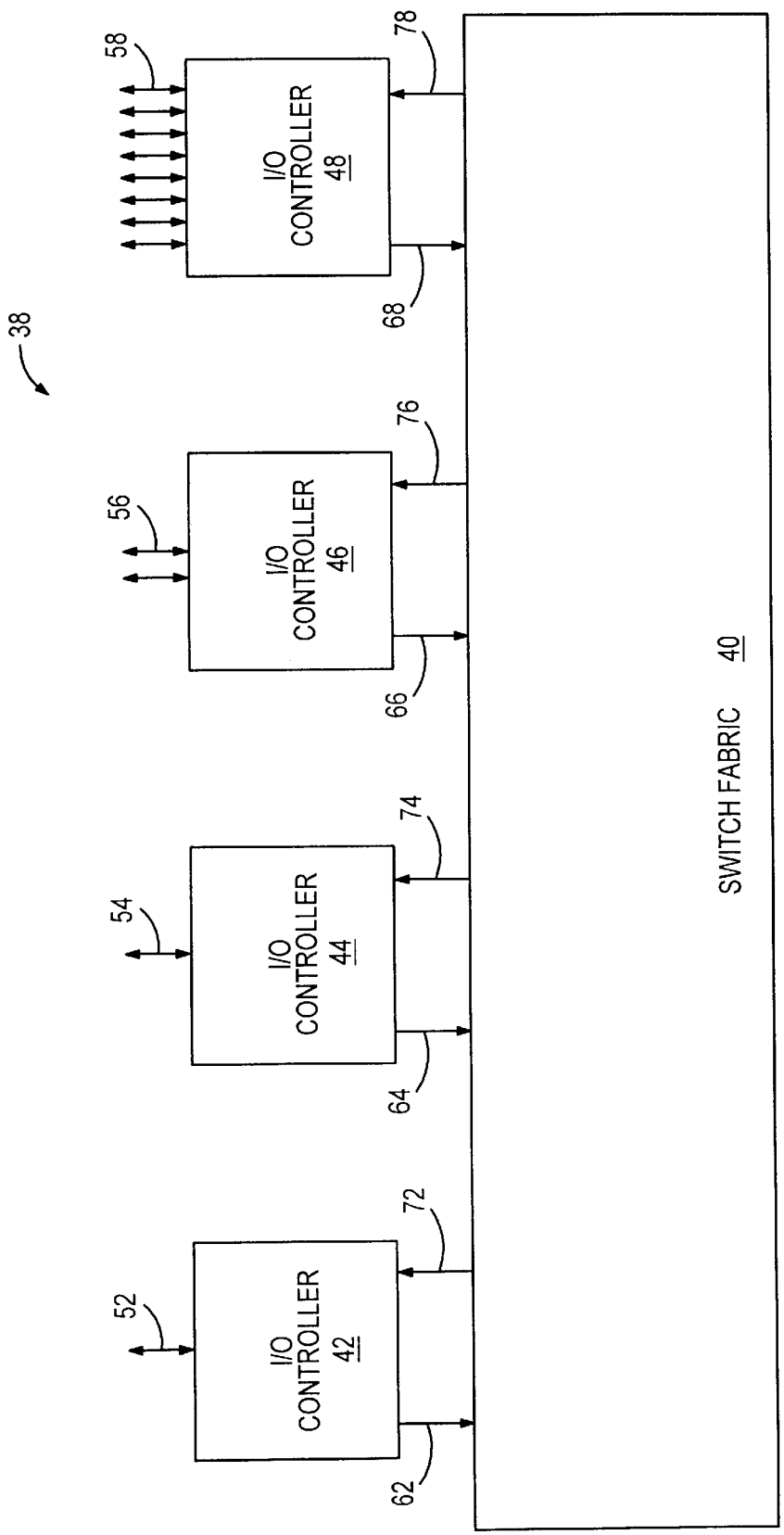
FIG. 3 is a depiction of the basic switch architecture of the preferred embodiment of the invention.

FIG. 3 is a depiction of the basic architecture of a switch 38 for forwarding variable-length packets that includes the preferred embodiment of the invention. Although a four-channel switch is shown for description purposes, the switch may have fewer but preferably has more channels. The preferred architecture includes data links 52, 54, 56, and 58 which are connected to input/output (I/O) controllers 42, 44, 46, and 48 which are connected to a switch fabric 40.

The data links 52–58 connected to the I/O controllers 42–48 provide the medium for transferring packets of data into and out of the switch 38. In a preferred embodiment, the number of data links connected to each I/O controller is based on the bandwidth capacity of the data link. For example, in FIG. 3 the single and double data links 52, 54, and 56 represent 1,000 Megabits per second (Mbps) connections and the eight data links 58 represent ten and/or 100 Mbps connections, although these connection bandwidths can be larger or smaller and the number of data links per I/O controller can be larger or smaller. In addition, the physical makeup of the data links is preferably twisted pair wires and/or single mode optical fibers, although other data links such as coaxial cable, multimode optical fiber, infrared, and/or radio frequency links, are possible.

The I/O controllers 42–48 are connected directly to the data links 52–58 and are connected to the switch fabric 40 by input connections 62, 64, 66, and 68 and by output connections 72, 74, 76, and 78. The I/O controllers provide the packet control between the data links and switch fabric. The I/O controllers receive incoming packets from the data links and transform the packets into digital data packets that are compatible with the switch 38. The I/O controllers also transmit outgoing data onto the data links. The I/O controllers buffer incoming and/or outgoing packets and the I/O controllers may perform some network traffic control. Finally, the I/O controllers supply the switch fabric with packets for processing through the fabric. The buffering of packets and managing the buffered queues is the focus of the invention that is described in detail below.

The switch fabric 40 provides the physical data paths to connect the different switch channels, and ultimately the data links 52–58, of the switch 38. The switch fabric also schedules packets to flow through the fabric in a manner that maximizes the bandwidth of the switch fabric. Preferably, the switch fabric is an integrated circuit that is able to forward packets at rates that exceed any single data link.

Because contention occurs when packets incoming on different data links desire to be output on the same data link, the I/O controller architecture includes input packet buffering and queue management functions that help to minimize packet losses. In addition, because the switch fabric may supply packets to an output data link faster than the data link can receive the packets, the I/O controller architecture includes output packet buffering and queue management. The preferred embodiment of the invention is described with reference to output packet buffering and queue management, although the invention is equally applicable to input packet buffering and queue management.

Figure 4:
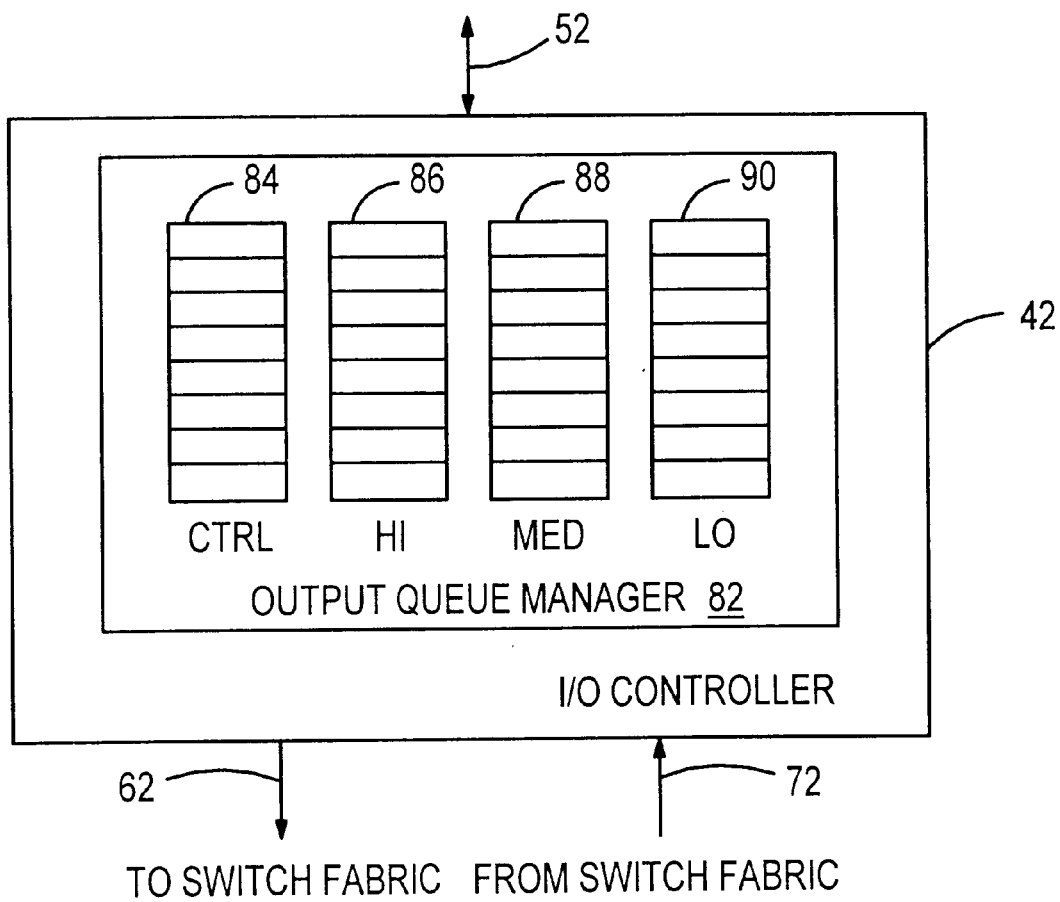
FIG. 4 is an expanded depiction of a preferred architecture of an input/output controller with one data link in accordance with the invention.

FIG. 4 is an expanded depiction of a preferred architecture of an I/O controller 42 from FIG. 3 that has a single data link 52. In the preferred embodiment, the I/O controller includes an output queue manager 82 that manages a packet queue representative of packets of data that are stored in an output buffer. The output queue manager is fully adjustable, while the switch is in operation, through a programming interface. The programming interface provides queue-specific adjustability that can be manipulated while the switch is in operation to provide a specified QoS. The buffer is an integrated circuit of dynamic random access memory (DRAM) where the packets are stored and the queues 84, 86, 88, and 90 in the output queue manager represent the packets that are stored within the buffer. The output buffer can be integrated into the I/O controller or it can be external to the I/O controller and in the preferred embodiment, the output buffer is located next to the I/O controller and not integrated onto the same circuit as the I/O controller, although this is not critical to the invention.

In the preferred embodiment, packets are prioritized into four categories based on certain characteristics of the packets. The packet characteristics of interest to the prioritization may include the source and/or destination of the packet, the type of information carried in the packet, or the age of the packet. For example, a packet carrying video conferencing data may have a higher priority than a packet carrying e-mail, because the quality of the video conference is negatively affected when packets are delayed while an e-mail transfer is more tolerant of packet delays. The four queues 84–90 in FIG. 4 track the established packet priority categories and the four priority categories for both the packets and the queues are defined, for description purposes, as control (CTRL), high (HI), medium (MED), and low (LO) where control is the highest priority and low is the lowest priority. Each of the four prioritized queues is depicted as containing eight registers relating to eight packets, although the exact number is not critical to the invention. The capacity of the queues may also be changed through a programming interface. The I/O controller of FIG. 4 receives packets from the switch fabric through the input connection 72, and if the packet is not immediately forwarded for output to the data link 52, the packet is buffered in memory and the appropriate queue within the queue manager is updated with information related to the buffered packet. In the preferred embodiment, the designation of packet and/or queue priorities is changeable during operation, or on the fly, through a programming interface.

Figure 5:
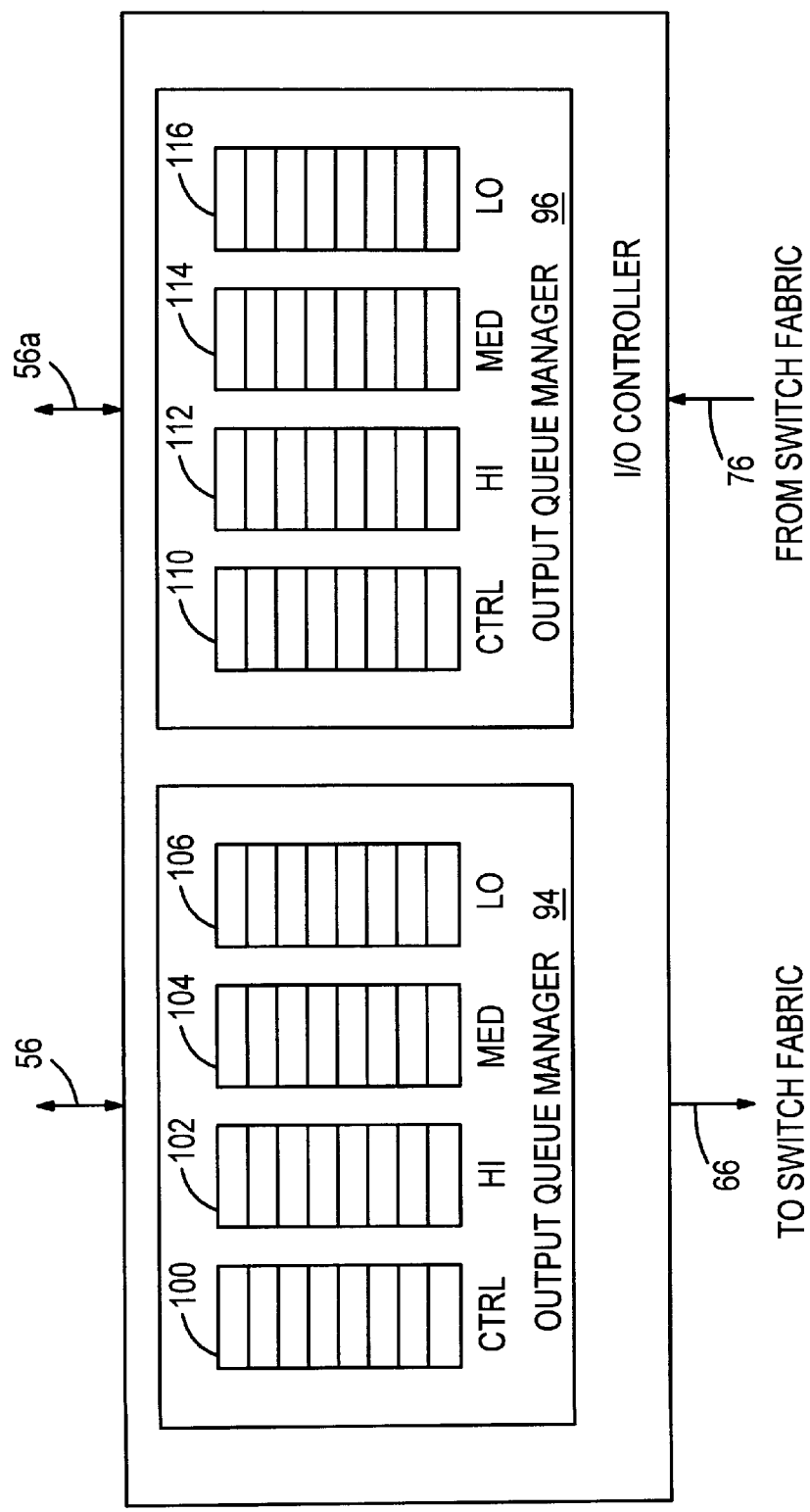
FIG. 5 is an expanded depiction of a preferred architecture of an input/output controller with two data links in accordance with the invention.

FIG. 5 is an expanded depiction of an I/O controller 46 of FIG. 3 that has two data links 56 and 56a. The I/O controller connected to the two data links includes separate output queue managers 94 and 96 for each of the data links. As with the I/O controller of FIG. 4, the two queue managers of FIG. 5 have four priority queues 100, 102, 104, 106 and 110, 112, 114, 116, respectively, where each queue contains eight registers related to eight packets. The output queue managers are related on a one-to-one basis to the two data links connected to the I/O controller and both of the output queue managers receive packets from the switch fabric through the same input connection 76. Although not depicted in an expanded view, an I/O controller 48 from FIG. 3 that has eight data links 58 has eight output queue managers corresponding on a one-to-one basis to the eight data links.

Figure 6:
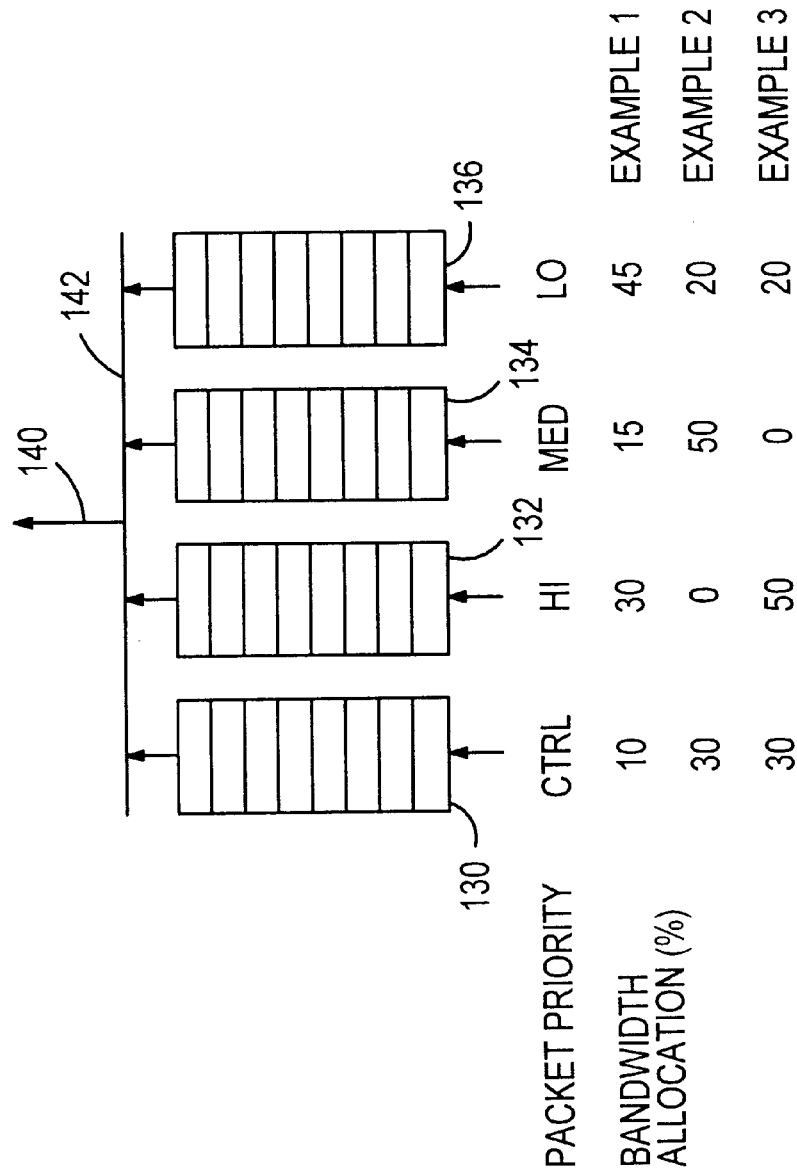
FIG. 6 is a depiction of the weighted priority queuing scheme in accordance with the invention.

FIG. 6 is a depiction of four queues 130, 132, 134, and 136 related to a single output queue manager as depicted in FIG. 4 that is used to describe the preferred queue management method. As described above, when conventional priority queuing is the only queue management scheme being utilized, all packets of a higher priority are forwarded before any packets of a lower priority. For example, under priority queuing, if there are any packets in the control queue 130 of FIG. 6 those packets will be forwarded to the data link 140 via an output bus 142 before packets from the high, medium, or low queues. In the queue management method of the invention, a weighted fair queuing scheme is implemented in conjunction with a priority queuing scheme to better utilize the finite bandwidth of the output.

FIG. 6 shows the packet priority related to each queue 130–136 in addition to alternative examples of how the total data link bandwidth can be allocated among the four queues. In Example 1, the control priority queue 130 is allocated 10% of the total data link bandwidth, the high priority queue 132 is allocated 30% of the total data link bandwidth, the medium priority queue 134 is allocated 15% of the total data link bandwidth, and the low priority queue 136 is allocated 45% of the total data link bandwidth. In the preferred embodiment, bandwidth allocation is fully adjustable while the network switch is in operation (run-time programmable) and is performed through a programming interface.

In operation, each queue is allocated its respective share, or percentage, of the total bandwidth over a designated period of time. During each designated time period, packets are released to the data link 140 in priority order such that the packets in the control queue 130 are released before the packets in the high queue 132 and so on. The key to the queue management method of the invention is that when a queue does not consume its entire allocated bandwidth during a designated time interval, the excess bandwidth is allocated to the other queues on a priority basis. That is, excess bandwidth is first offered to the control queue, and if the control queue has enough waiting packets the entire excess bandwidth is consumed by the control queue. On the other hand, if the control queue does not consume all of the excess bandwidth, then the excess bandwidth is offered to the next lower priority queue and so on until all of the available output bandwidth is consumed or until no packets remain in the combined output buffer.

As an example of the operation, refer again to Example 1 of FIG. 6. During one designated time period 10% of the total data link bandwidth is offered to the control priority queue 130 and, for example purposes, assume that the control priority queue has more than enough packets to consume 10% of the data link bandwidth and so the 10% of the bandwidth is consumed. Next, the high priority queue 132 is offered 30% of the bandwidth and, for example purposes, assume that the high priority queue has more than enough packets to consume its 30% of the bandwidth and so the 30% of bandwidth is consumed. Next, the medium priority queue 134 is offered 15% of the bandwidth and, for example purposes, assume that the medium priority queue has no packets waiting to be forwarded. In order to avoid wasting the allocated bandwidth and to maximize the utilization of the available bandwidth of the data link, the 15% of the data link bandwidth that is allocated to the medium priority queue for the present time interval is offered to the higher priority queues in priority order. That is, the 15% of allocated data link bandwidth from the medium priority queue is first offered entirely to the control priority queue. If the control priority queue has enough packets waiting, it will consume all of the excess bandwidth, or if the control priority queue does not consume all of the excess bandwidth then the remaining excess bandwidth is offered to the high priority queue. Further, if the high priority queue does not consume the excess bandwidth, then the excess bandwidth is offered to the low priority queue 136. Under this prioritized distribution of excess bandwidth, excess bandwidth will never be wasted as long as there are buffered packets.

Allocated bandwidth in the weighted priority queuing scheme can be adjusted through the programming interface to specify a certain QoS and to create different traffic patterns. For example, referring to Example 2 of FIG. 6, the control priority queue 130 is allocated 30% of the total data link bandwidth, the high priority queue 132 is allocated 0% of the total data link bandwidth, the medium priority queue 134 is allocated 50% of the total data link bandwidth, and the low priority queue 136 is allocated 20% of the total data link bandwidth. When a queue, such as the high priority queue, is allocated 0% of the bandwidth, in effect the queue with 0% allocated bandwidth and the next higher priority queue share excess bandwidth according to a pure priority scheme. In Example 2, any excess bandwidth from the control priority queue is offered first to the high priority queue even though the high priority queue is allocated 0% of the bandwidth. In Example 3, any excess bandwidth offered to the high priority queue is shared between the high priority queue and the medium priority queue according to a pure priority scheme even though the medium priority queue is allocated 0% of the bandwidth.

One of the main operating considerations of the weighted priority queuing scheme of the invention is the balancing between latency and error. In the context of the invention, latency is the amount of time that expires between a first packet from a particular queue entering an output data link and the next packet from the same queue entering the same output data link after all of the other priority queues have been offered their allocated bandwidth. For example, referring to Example 1 of FIG. 6, latency is the time period that starts when a first packet is issued from the control priority queue and then ends when all of the other priority queues have consumed their allocated bandwidth and a second packet is issued from the control priority queue 130 during a new allocation cycle. The latency of packets is directly related to the bandwidth allocation cycle time that is selected, where the bandwidth allocation cycle time is the total time interval for one bandwidth allocation cycle. For example, if the bandwidth allocation cycle time for the queues of FIG. 6 is one millisecond (ms), then the control priority queue gets 0.10 ms of the total bandwidth every one ms, the high priority queue 132 gets 0.30 ms of the total bandwidth every one ms, the medium priority queue 134 gets 0.15 ms of the total bandwidth every one ms, and the low priority queue 136 gets 0.45 ms of the total bandwidth every one ms. The bandwidth allocation cycle time is fully programmable and packet latency is measured using packet sizes that can be completely forwarded in a time interval that is allocated to a specific queue.

Error is a measure of how closely actual bandwidth consumption on a target output data link compares to the established bandwidth allocation proportions. Error is caused because once a packet begins transmitting from a buffer onto a data link the packet continues being transmitted until the transmission is complete. When a packet takes more time to transmit than the queue specific time interval, or time slice, that is allocated for the particular queue, the packet transmission continues and the error grows in proportion to the excess time consumed. Error is most prevalent in transmission protocols that allow variable-length packets because the size of the packet awaiting transfer is unpredictable. For example, if the control priority queue is allowed 0.10 ms of data link bandwidth every one ms and a control priority packet takes 0.15 ms to be completely transmitted from a buffer to the output data link, then for the current bandwidth allocation cycle 0.05 ms of unallocated transmission time is used by the control priority queue and therefore the 0.05 ms must be eliminated from the transmission time available to the lower priority queues.

When balancing latency and error to provide a specified QoS, a relatively long bandwidth allocation cycle time will create high packet latency but a low error rate. If latency is too high, queues may be practically starved between cycle times and packets may begin to be dropped. On the other hand, a relatively short bandwidth allocation cycle time will create low packet latency but a high error rate as more packets exceed the relatively short queue-specific time intervals that are allocated for packet transmission. Implementing weighted priority queuing in a 100 Mbps ethernet network where packets sizes range from 64 bytes to 1,500 bytes, a bandwidth allocation cycle time, or latency, of 1.28 ms has an error of approximately 9.38% and a latency of 163.84 ms has an error of approximately 0.7%. The error distribution scales with other data rates.

Figure 7:
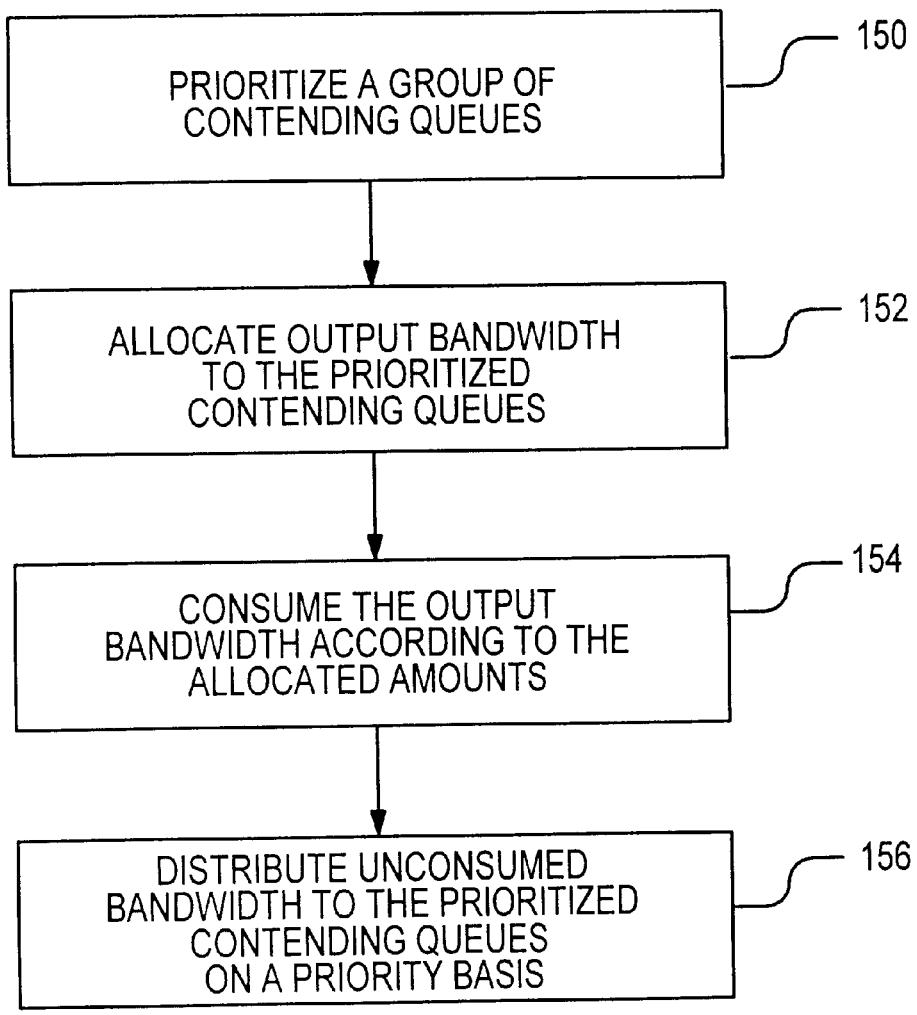
FIG. 7 is a process flow diagram for forwarding packets in accordance with the invention.

FIG. 7 is a process flow diagram for forwarding packets in accordance with a preferred embodiment of the invention. In a first step 150, a group of contending queues are prioritized relative to one another from a highest priority queue to a lowest priority queue. In a next step 152, portions of the bandwidth of an output are allocated to the group of prioritized queues. In a next step 154, the bandwidth of the output is consumed by packets from the prioritized queues according to the portions of bandwidth that are allocated to each queue. In a next step 156, bandwidth that is not consumed by the queues according to the allocated portion is distributed to the queues on a priority basis. In the preferred embodiment, the unconsumed bandwidth is first offered to the highest priority queue before any other queues and the unconsumed bandwidth is only offered to the lowest priority after the bandwidth has been offered to all of the higher priority queues.

Figure 8:
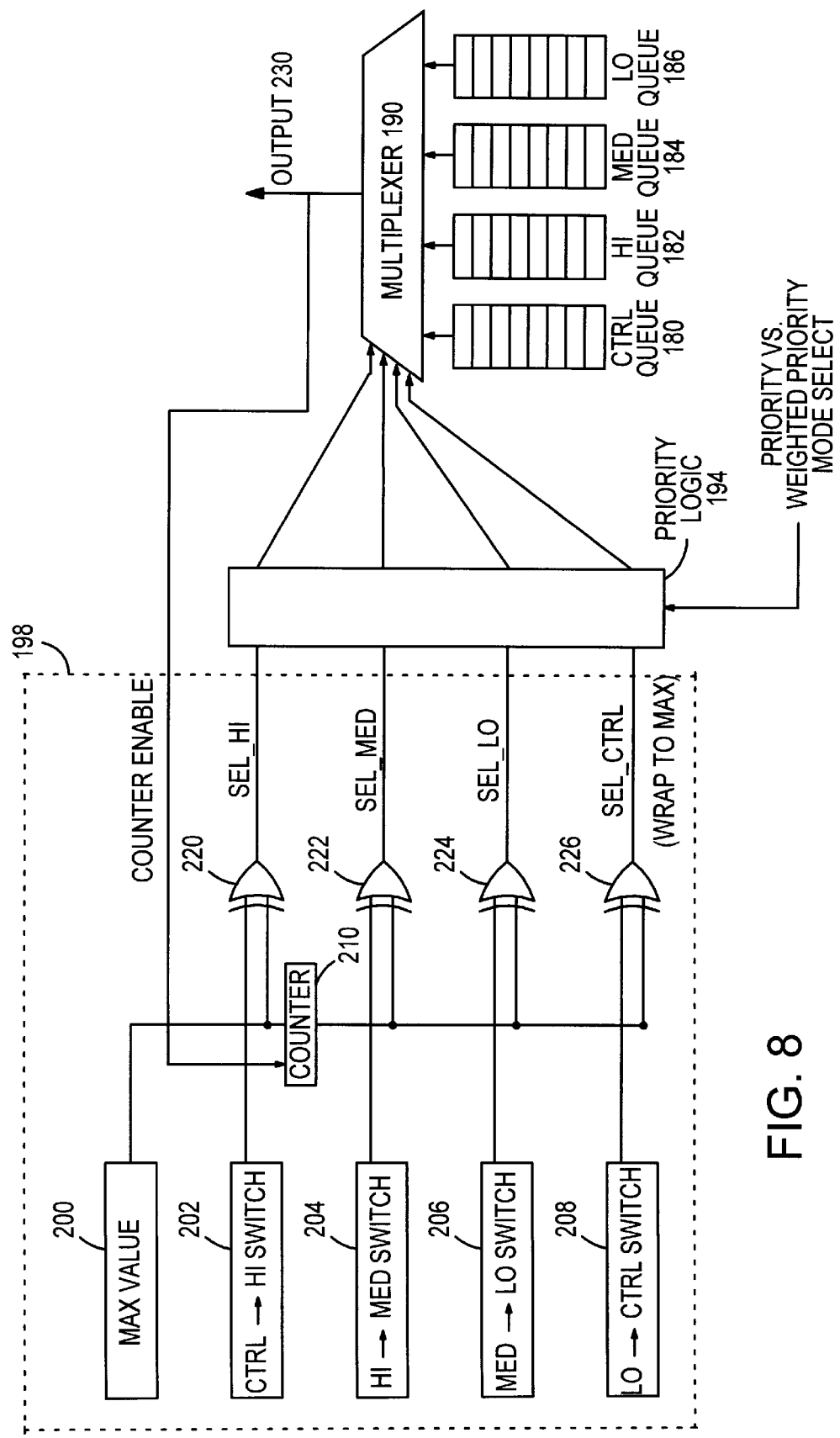
FIG. 8 is a depiction of the basic hardware architecture for performing weighted priority queuing in accordance with the invention.

FIG. 8 is a depiction of the basic architecture of a hardware implementation of the preferred weighted priority queuing scheme. The preferred hardware includes four prioritized queues 180, 182, 184, and 186, a multiplexer 190, priority logic 194, and weighted fair queuing logic 198 embedded in an ASIC. The weighted fair queuing logic includes registers 200, 202, 204, 206, and 208, a counter 210, and comparators 220, 222, 224, and 226. The registers are used to establish the bandwidth allocation proportions of the queues. The counter is decremented from a maximum value at regular time intervals as dictated by a system clock. The comparators compare the counter value to the register values to determine which priority queue should have access to the output 230. When the counter value drops below one of the register values, the respective comparator is tripped and a select signal is sent from the comparator to the priority logic. The select signal identifies to the priority logic which allocated portion of bandwidth is active. The priority logic passes the signal to the multiplexer and the multiplexer monitors the queues to determine if there are packets waiting in the selected queue. If monitoring determines that there are packets waiting in the selected queue then the packets are forwarded to the output until the counter value trips the next priority queue. On the other hand, if there are not enough packets to consume the entire allocation of bandwidth, the priority logic is called upon to distribute the unconsumed bandwidth in strict priority order.

FIG. 9 depicts the five register values that represent the four queue specific time intervals, or time slices, corresponding to the bandwidth allocations of Example 1 of FIG. 6. During each bandwidth allocation cycle, the 14 bit counter counts down from the maximum value of 16,384 ($2^{14}$) and the counter value is compared to the four smaller register values. Bandwidth is allocated to the respective queues when the counter value is within a queue specific time interval, or time slice, established by the register values.

In the preferred embodiment, the counter has 16 bits, although all 16 bits are not necessarily utilized. Table 1 gives the relationship between the selected resolution of the counter and the latency and error of a system that transmits 32-byte cells at 100 Mbps.

For flexibility, the switch can be selected to operate in a pure priority queuing mode or the switch can be selected to operate in the weighted priority queuing mode that is the focus of the invention.

TABLE 1

BIT RESOLUTION VERSUS LATENCY AND ERROR

| COUNTER BITS | CELL COUNT | LATENCY (ms) | ERROR (%) |
|---|---|---|---|
| 9 | 512 | 1.28 | 9.38 |
| 10 | 1024 | 2.56 | 4.69 |
| 11 | 2048 | 5.12 | 2.34 |
| 12 | 4096 | 10.24 | 1.17 |
| 13 | 8192 | 20.48 | 0.59 |
| 14 | 16384 | 40.96 | 0.29 |
| 15 | 32768 | 81.92 | 0.15 |
| 16 | 65536 | 163.84 | 0.07 |

What is claimed is:

1. A method for forwarding packets from a plurality of contending queues to an output having a finite bandwidth comprising the steps of:

prioritizing each queue of said plurality of queues with a priority that is fixed relative to the other queues of said plurality of queues, thereby defining a fixed prioritization range that includes a highest priority queue and a lowest priority queue;

allocating a share of said bandwidth of said output to each of said queues;

consuming at least a portion of said bandwidth of said output with packets from said queues according to said allocated shares, leaving an unconsumed portion when at least one of said queues does not exhaust the allocated share of said at least one queue; and distributing one hundred percent of said unconsumed portion of said bandwidth to said queues on a fixed priority basis, wherein one hundred percent of said unconsumed portion of said bandwidth is offered first to said highest priority queue and then any remaining portion of said unconsumed portion of said bandwidth is offered to lower priority queues, on a queue by queue basis, according to said fixed prioritization range until all of said bandwidth is consumed or until there are no more queued packets.

2. The method of claim 1 wherein said step of prioritizing said plurality of queues includes a step of prioritizing each of said queues with a different priority relative to the other queues of said queues.

3. The method of claim 2 further comprising a step of prioritizing said packets into a prioritization range that directly relates to said prioritization range of said queues.

4. The method of claim 2 wherein said step of consuming said bandwidth includes a step of forwarding said packets to an output port of a multiport switch.

5. The method of claim 1 wherein said step of allocating shares of said bandwidth includes the step of utilizing a programming interface to set register values, in circuitry, that correspond to said allocated shares of said bandwidth.

6. The method of claim 5 wherein said step of consuming bandwidth includes steps of:

changing a clock counter value in relation to a system clock; and comparing said clock counter value to said register values to control bandwidth consumption.

7. The method of claim 6 wherein said step of comparing includes a step of inputting said counter value and one of said register values into a comparator circuit.

8. An application-specific integrated circuit (ASIC) having a plurality of queues related to packets contending for the same output, where said output has a bandwidth capacity comprising:

means for identifying a fixed priority order among said plurality of queues wherein one queue has a highest priority among said queues and a different queue has a lowest priority among said queues;

means for allocating a percentage of said bandwidth capacity of said output to each of said queues;

means, formed in circuitry that is specific to said queue management, for forwarding packets to said output according to said allocated percentages; and means, formed in circuitry that is specific to queue management, for distributing one hundred percent of any unused bandwidth capacity to said plurality of queues according to said fixed priority order such that said queue with said highest priority is first offered one hundred percent of said unused bandwidth capacity and then lower priority queues are offered one hundred percent of any remaining unused bandwidth, one queue at a time, according to said fixed priority order from highest priority to lowest priority until all of said bandwidth capacity is distributed or until no packets remain for forwarding.

9. The ASIC of claim 8 wherein said means for allocating is formed in circuitry that is specific to said queue management.

10. The ASIC of claim 8 wherein said means for allocating includes run-time programmable registers that are set to register values that define time intervals.

11. The ASIC of claim 10 wherein said means for forwarding includes a clock counter that generates counter values.

12. The ASIC of claim 11 wherein said means for forwarding packets includes a plurality of comparators, wherein each comparator has a first input for receiving one of said counter values and a second input for receiving one of said register values.

13. The ASIC of claim 8 wherein said ASIC is part of a multiport switch having input ports for receiving packets, output ports for transmitting packets, and a switch fabric for directing packets from said input ports to said output ports.

14. The ASIC of claim 13 wherein said ASIC is connected to memory that stores packets in said multiport switch that have already been forwarded through said switch fabric.

15. A method of forwarding contending variable-length packets from an output buffer to an output port of a multiport switch comprising steps of:

prioritizing output queues that store information representative of said contending variable-length packets such that each output queue has a different fixed priority relative to the other of said output queues;

allocating bandwidth of said output port among said prioritized output queues such that said prioritized output queues have allocated shares of said bandwidth;

forwarding, from said output buffer to said output port, contending variable-length packets represented by said information stored within said prioritized output queues according to said bandwidth allocations;

monitoring said forwarding of said contending variable-length packets to detect bandwidth allocations in excess of bandwidth consumed by said contending variable-length packets;

offering one hundred percent of any excess bandwidth allocations that are detected by said monitoring to a highest priority output queue of said prioritized output queues that includes a variable-length packet to be forwarded to said output port of said multiport switch; and offering any remaining portions of said excess bandwidth allocations to lower priority output queues on a queue-by-queue basis until all of said remaining portions of said excess bandwidth allocations are consumed, said remaining portions of said excess bandwidth allocations being offered to said prioritized output queues in priority order from highest priority to lowest priority.

16. The method of claim 15 wherein said step of storing includes steps of:

prioritizing said contending variable-length packets; and storing said prioritized contending variable-length packets in similarly prioritized queues of said prioritized output queues.

17. The method of claim 15 wherein said step of allocating bandwidth includes a step of setting register values that represent time intervals in an application specific integrated circuit on a queue specific basis while said multiport switch is forwarding packets.

18. The method of claim 17 further comprising a step of utilizing a programming interface to override said step of offering excess bandwidth allocations to said highest priority output queue, thereby distributing bandwidth on a pure priority basis.

19. The method of claim 15 further including a step of adjusting a queue specific time interval in order to change a packet latency characteristic of said multiport switch.

20. A method for forwarding packets from a plurality of contending queues to an output having a finite bandwidth comprising the steps of:

prioritizing said plurality of queues such that each of said queues has a priority relative to the other queues of said plurality of queues, thereby defining a prioritization range that includes a highest priority queue and a lowest priority queue;

allocating a share of said bandwidth of said output to each of said queues, said step of allocating including a step of utilizing a programming interface to set register values, in circuitry, that correspond to said allocated shares of said bandwidth;

consuming at least a portion of said bandwidth of said output with packets from said queues according to said allocated shares, leaving an unconsumed portion when at least one of said queues does not exhaust the allocated share of said at least one queue, said step of consuming including steps of changing a clock counter value in relation to a system clock and comparing said clock counter value to said register values to control bandwidth consumption; and distributing said unconsumed portion of said bandwidth to said queues according to said prioritization range.

21. The method of claim 20 wherein said step of prioritizing said plurality of queues includes a step of prioritizing each of said queues with a different priority relative to the other queues of said queues.

22. The method of claim 21 further comprising a step of prioritizing said packets into a prioritization range that directly relates to said prioritization range of said queues.

23. The method of claim 21 wherein said step of distributing said unconsumed portion of said bandwidth includes steps of:

offering said unconsumed portion to said highest priority queue before any other of said queues; and offering said unconsumed portion to said lowest priority queue only after said unconsumed portion has been offered to higher priority queues of said queues.

24. The method of claim 23 wherein said step of consuming said bandwidth includes a step of forwarding said packets to an output port of a multiport switch.

25. The method of claim 20 wherein said step of comparing includes a step of inputting said counter value and one of said register values into a comparator circuit.

26. An application-specific integrated circuit (ASIC) having a plurality of queues related to packets contending for the same output, where said output has a bandwidth capacity comprising:

means for identifying a priority order among said plurality of queues wherein one queue has a highest priority among said queues and a different queue has a lowest priority among said queues;

means for allocating a percentage of said bandwidth capacity of said output to each of said queues, said means for allocating including run-time programmable registers that are set to register values that define time intervals;

means, formed in circuitry that is specific to said queue management, for forwarding packets to said output according to said allocated percentages; and means, formed in circuitry that is specific to queue management, for distributing unused bandwidth capacity to said plurality of queues in priority order from said queue with said highest priority to said queue with said lowest priority.

27. The ASIC of claim 26 wherein said means for allocating is formed in circuitry that is specific to said queue management.

28. The ASIC of claim 26 wherein said means for forwarding includes a clock counter that generates counter values.

29. The ASIC of claim 28 wherein said means for forwarding packets includes a plurality of comparators, wherein each comparator has a first input for receiving one of said counter values and a second input for receiving one of said register values.

30. The ASIC of claim 26 wherein said ASIC is part of a multiport switch having input ports for receiving packets, output ports for transmitting packets, and a switch fabric for directing packets from said input ports to said output ports.

31. The ASIC of claim 30 wherein said ASIC is connected to memory that stores packets in said multiport switch that have already been forwarded through said switch fabric.

32. A method of forwarding contending variable-length packets from output queues to an output port of a multiport switch comprising steps of:

prioritizing said output queues such that each output queue has a different priority relative to the other of said contending queues;

storing said contending variable-length packets in output queues of said prioritized output queues;

allocating bandwidth of said output port among said prioritized output queues such that said prioritized output queues have allocated shares of said bandwidth, including setting register values that represent time intervals in an application specific integrated circuit on a queue specific basis while said multiport switch is forwarding packets;

forwarding contending variable-length packets from said prioritized output queues to said output ports according to said bandwidth allocations;

monitoring said forwarding of contending variable-length packets to detect bandwidth allocations in excess of bandwidth consumed by said contending variable-length packets in said prioritized output queues; and offering excess bandwidth allocations that are detected by said monitoring to a highest priority output queue of said prioritized output queues that has a variable-length packet to be forwarded to said output port of said multiport switch.

33. The method of claim 32 wherein said step of storing includes steps of:

prioritizing said contending variable-length packets; and storing said prioritized contending variable-length packets in similarly prioritized queues of said prioritized output queues.

34. The method of claim 32 further comprising a step of utilizing a programming interface to override said step of offering excess bandwidth allocations to said highest priority output queue, thereby distributing bandwidth on a pure priority basis.

35. The method of claim 32 further including a step of adjusting a queue specific time interval in order to change a packet latency characteristic of said multiport switch.

* * * * *